Figure 1:
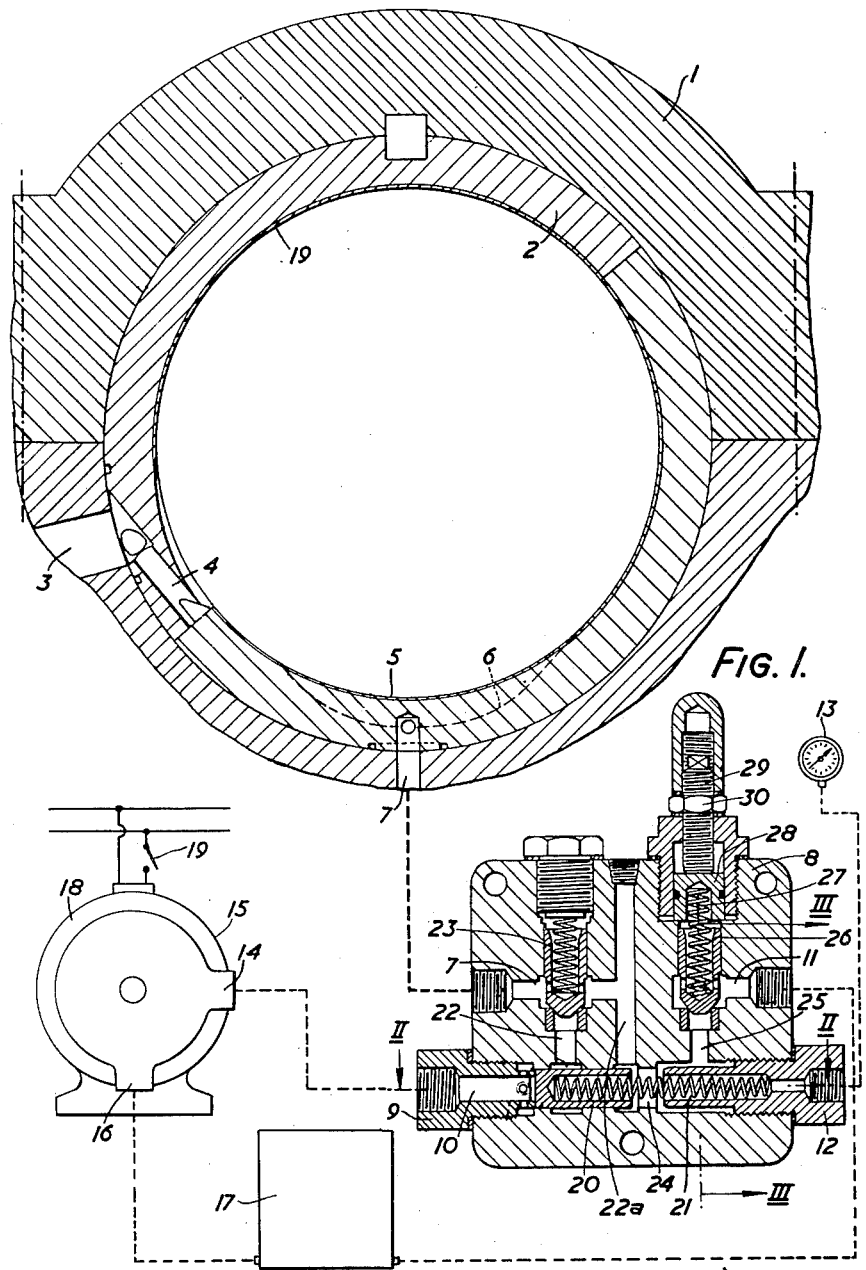

INVENTOR
PHIL P. LOVE

3,029,111
VALVE APPARATUS FOR CONTROLLING AN OIL SUPPLY TO A PLAIN BEARING
Phil Prince Love, Alperton, Wembley, England, assignor to The Glacier Metal Company Limited, Alperton, Wembley, England, a company of Great Britain
Filed June 1, 1959, Ser. No. 817,095
Claims priority, application Great Britain June 9, 1958
8 Claims. (Cl. 308—9)

This invention relates to valve apparatus for controlling an oil supply to a plain bearing assembly of the kind, used for example in high speed turbines to support the turbine rotor, which includes means whereby, before starting and/or stopping the shaft supported by the bearing, the shaft can be jacked up on a film of oil by delivering oil under pressure to the lower part of the bearing, which part will therefore for convenience herein be termed "the jacking oil area" of the bearing.

The invention is applicable to such bearings whether, as is at present normal, the bearing contains a special jacking oil recess in the jacking oil area to receive the jacking oil, or has no special recess for this purpose as, for example, in one of the arrangements described in the specification of my United States of America patent appln. No. 799,664, filed March 16, 1959, of which this application is a continuation in part, now Patent No. 3,011,838, wherein grooves, not primarily for jacking oil are provided in the lower part of the bearing communicating with a pressure relief valve, but serving if desired also as a jacking oil recess to which the jacking oil can be delivered.

An object of the invention is to provide an improved form of valve apparatus for the control of an oil supply to a plain bearing of the kind referred to which will tend not only to provide for the supply of jacking oil when required but to exercise control over the oil film in the appropriate part of the bearing during normal operation in a manner ensuring the maintenance of a satisfactory oil film at all times.

To this end according to the invention valve apparatus is constructed and arranged to communicate with a main load carrying region or regions of a plain bearing assembly and under normal running conditions automatically to limit the oil pressure in said main load carrying region or regions to a predetermined or set value, but automatically to be inoperative to limit the pressure in such region or regions to such predetermined or pre-set value when jacking oil at higher pressure is delivered to such region or regions from a source of relatively high pressure jacking oil.

By plain bearing assembly is meant any plain cylindrical or thrust bearing of such geometrical shape as at normal operating speed will initiate and sustain a hydrodynamic film of oil by virtue of its rotation or sliding, in which can be incorporated one or more grooves or recesses in the regions of maximum hydrodynamic pressure, which grooves or recesses can be connected externally to a source of oil under pressure, and which are used for relieving pressure in the bearing and for jacking up the shaft prior to starting or stopping.

Conveniently the valve apparatus according to the invention comprises a jacking oil supply passage for connection to a source of jacking oil under pressure, a bearing oil passage leading to the loaded area or areas of the bearing, a relief valve constructed to open at a predetermined or set pressure and a valve arranged to control the connection between the jacking oil supply passage and the bearing oil passage on the one hand and between the bearing oil passage and the relief valve on the other hand and having a "normal" position in which it connects the bearing oil passage to the relief valve and a "jacking" position into which it is automatically moved upon the supply of jacking oil under pressure and in which it shuts off the bearing oil passage from the relief valve and connects the bearing oil passage to the jacking oil supply passage.

In one arrangement the control valve comprises a shuttle type valve arranged to be moved automatically from its "normal" position to its "jacking" position by the supply of jacking oil under pressure.

In another alternative the relief valve may have limited flow capacity and be so arranged that under normal running conditions it opens to a lesser degree to maintain the required predetermined or set pressure, whereas upon the supply of jacking oil it moves to a greater degree and then closes so as to prevent the escape of the jacking oil through it.

Preferably means are provided by which the pressure at which the relief valve opens can be adjusted to suit requirements and in this case a pressure gauge may be provided arranged to indicate the pressure in the passage leading from the bearing oil passage to the relief valve in order to facilitate such adjustment.

Moreover according to a further feature of the invention, a controlled leak, preferably adjustable, may be provided by which the rate of return of the shuttle type valve to its normal position upon the supply of jacking oil being cut off, can be controlled.

Figure 2:
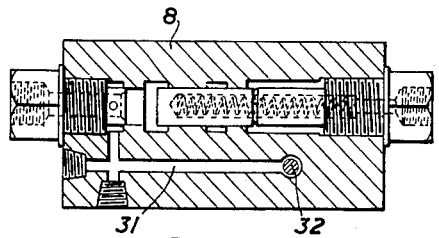
Figure 3:
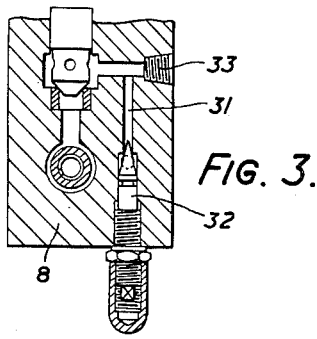
Figure 4:
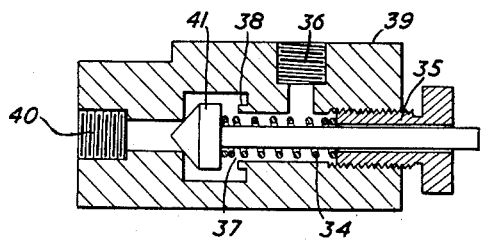

The construction of valve according to the invention may vary but two forms of the invention are shown in the accompanying drawings in which FIGURE 1 is a view, partly diagrammatic and partly in cross-section, of one form of valve apparatus according to the invention together with a bearing of the kind referred to with which it is to be used, and means for supplying jacking oil when required, FIGURE 2 is a cross-section of the valve apparatus shown in FIGURE 1 taken on the line II—II of FIGURE 1, FIGURE 3 is a cross-section on the line III—III of FIGURE 1, and FIGURE 4 shows a modified and simplified form of valve apparatus according to the invention.

In the arrangement shown in FIGURE 1 the bearing in association with which the valve apparatus according to the invention is used is of the kind forming the subject of said United States of America patent application No. 799,664 and comprises a two-part housing 1 of conventional form within which is mounted a two-part plain cylindrical bearing 2, the housing 1 and the bearing 2 being provided with intercommunicating oil delivery passages 3 and 4 through which, during normal operation, oil is supplied to an appropriate area of the bearing for normal lubrication purposes. The lower part of the bearing, indicated generally by the reference numeral 5, constitutes a jacking area and to this end is formed with two or more spaced circumferentially extending grooves indicated generally by the dotted line 6, with which grooves communicate a passage 7 connected to the valve apparatus and constituting the "bearing oil passage" referred to above, that is to say the passage which is connected either to the jacking oil passage or to the relief valve by the valve apparatus.

The valve apparatus comprises a generally rectangular housing 8 having therein a bore 7 constituting part of the bearing oil passage 7 referred to above and therefore identified by the same reference number, a tubular insert 9 containing a bore 10 constituting a jacking oil passage, a bore 11 constituting a relief or outlet passage, and a second tubular insert 12 to which a pressure gauge may be connected as indicated at 13.

The passage 10 is connected to the delivery port 14 of an oil pump 15 having an inlet 16 communicating with a sump or reservoir 17, the oil pump being arranged to be driven by an electric motor indicated at 18 under the control of a manually-operated switch indicated at 19 so that, when desired, the motor 18 can be switched on to cause the pump 15 to deliver jacking oil under pressure through the jacking oil passage 10. Arranged within the housing 8 is a shuttle valve 20 urged in one direction by a spring 21 so that normally it occupies the position shown. As will be clear, the lefthand end face of this shuttle valve is subject to the pressure in the jacking oil passage 10 and the valve is arranged to control two ports 22 and 22a in such manner that when jacking oil under pressure is delivered to the jacking oil passage 10 the shuttle valve 20, by moving to the right, opens the port 22 and closes the port 22a, whereas normally the valve maintains the port 22a open and the port 22 closed. The port 22 communicates through a spring-pressed non-return valve 23 with the bearing oil passage 7 and this passage also communicates at all times with the port 22a.

When the port 22a is open it communicates through a bore 24 with a passage 25 communication between which and the relief passage 11 is controlled by a relief valve 26 acted upon by a spring 27. The upper end of the spring 27 bears against an abutment 28 which is adjustable by means of an adjusting screw 29 having an associated lock-nut 30. The relief port 11 may communicate, for example as shown, with the sump or reservoir 17.

During normal operation of the bearing 1, 2 the shuttle valve 20 occupies the position shown in which the bearing oil passage 7 communicates through the port 22a and the passages 24, 25 with the relief valve 26 which thus, during normal operation, determines the pressure maintained in the part of the bearing representing the jacking area. When, however, as when starting-up or shutting-down of the apparatus in which the bearing 1, 2 is incorporated, the switch 19 is closed to cause the pump 15 to supply jacking oil under pressure to the jacking oil passage 10, the shuttle valve 20 moves to the right to close the port 22a and open the port 22 so that the bearing oil passage 7 is cut off from the relief valve 26 and is connected via the non-return valve 23 to the jacking oil passage whereby jacking oil is delivered through the passage 7 to the jacking area of the bearing.

It will be seen that by adjustment of the spring 27 of the relief valve 26 the pressure maintained during normal operation in the jacking area of the bearing can be adjusted and that the adjustment of this pressure to a desired value may be assisted by the use of the pressure gauge 13 which at such times indicates approximately the pressure in the bearing oil passage 7.

Also provided in the housing 8 is a leak passage 31 (see FIGURES 2 and 3) leading from the passage 10 and containing an adjustable leak valve 32 by which the rate of escape of oil from the passage 10 to a relief 33 and thence to the sump or reservoir 17 can be controlled. This enables the rate of return of the valve 20 to its normal position, after the delivering of jacking oil to the passage 10 has been shut off, to be controlled.

In the modified form of valve apparatus shown in FIGURE 4 the valve apparatus comprises a valve body 39 having formed therein a passage 40 which in use will communicate with the main load carrying area of the bearing, that is to say the area 5 in the bearing shown in FIGURE 1 and also directly with the source of jacking oil, that is to say the passage 14 in FIGURE 1. Controlling the passage 40 is a spring-pressed relief valve 41, the spring 34 of which may be adjustable by means of the screwthreaded combined thrust collar and guide 35. During normal operation the valve 41 opens against the action of its spring to a limited extent to permit flow of oil through the passage 40 to an outlet passage 36 leading to the oil sump or reservoir (17 in FIGURE 1). Under such "normal" conditions the oil flowing through the valve 41 passes through a port 37 surrounded by a seating 38 on which the right hand end of the valve 41 will seat if and when it moves to the right beyond its normal position. The arrangement is such that when jacking oil is supplied the valve 41 moves to the right beyond its normal position so as to seat on the seating 38 and thus completely prevent escape of jacking oil through it.

What I claim as my invention and desire to secure by Letters Patent is:

1. Bearing apparatus including in combination a plain bearing assembly, inlet means for delivering lubricant to the clearance space of said bearing assembly during normal operation thereof, at least one passage separate from said inlet means communicating with a main load-carrying region of said clearance space of said bearing assembly, valve apparatus including first valve means normally permitting flow of lubricant through said passage from said region at a predetermined pressure, jacking oil inlet passage means for the supply of jacking oil at higher pressure than said predetermined pressure to said region, and second valve means which automatically prevent flow of oil through said first valve means when jacking oil at said higher pressure is delivered through said jacking oil passage means.

2. Bearing apparatus comprising in combination a plain bearing assembly, inlet means for delivering lubricant to the clearance space of said bearing assembly during normal operation thereof, at least one passage communicating with a main load-carrying region of said clearance space, valve apparatus including a relief valve in said passage permitting flow of lubricant through said passage from said region at a predetermined pressure, a spring acting on said relief valve and urging said relief valve towards its closed position against the action of fluid pressure in the part of said passage between said relief valve and said region, jacking oil passage means for the delivery of jacking oil at higher pressure than said predetermined pressure to said part of said passage, and valve means which automatically shuts off said part of said passage to said relief valve upon delivery of jacking oil at said higher pressure through said jacking oil passage means.

3. Bearing apparatus as claimed in claim 2, in which said valve means comprise a shuttle type valve subject to the pressure in said jacking oil passage means in one direction, and a spring acting on said shuttle type valve in the other direction, said shuttle type valve when moved against the action of said spring opening communication between said jacking oil passage means and said region and closing communication between said region and said relief valve.

4. Bearing apparatus as claimed in claim 3 including a non return valve situated between said shuttle type valve and said region.

5. Bearing apparatus as claimed in claim 3 including controlled leak means controlling the rate of movement of the said shuttle type valve under the action of said spring upon shutting off of the supply of said jacking oil.

6. Bearing apparatus as claimed in claim 5, in which said controlled leak means is adjustable.

7. Bearing apparatus as claimed in claim 1 including adjusting means for adjusting the predetermined pressure maintained by the first valve means.

8. Bearing apparatus as claimed in claim 1 in which the said first valve means has a small flow capacity and permits flow of lubricant through the said passage from said region at a predetermined pressure, and said second valve means is movable by said first valve means, closing said passage when said first valve means opens beyond a predetermined point upon delivery of said jacking oil.

(References on following page)

References Cited in the file of this patent

UNITED STATES PATENTS

| | | |
|---|---|---|
| 763,876 | Geiger | June 28, 1904 |
| 936,074 | Annable | Oct. 5, 1909 |
| 952,299 | Bilbrey | Mar. 15, 1910 |
| 2,115,512 | Vincent | Apr. 26, 1938 |
| 2,375,269 | Yeomans | May 8, 1945 |
| 2,703,582 | Stepanian | Mar. 8, 1955 |
| 2,745,625 | Booth | May 15, 1956 |
| 2,778,339 | Mancusi | Jan. 22, 1957 |
| 2,859,763 | Fites | Nov. 11, 1958 |